United States Patent
Selvarajan et al.

(10) Patent No.: US 12,145,732 B2
(45) Date of Patent: Nov. 19, 2024

(54) VEHICLE SEATING ROWS FOR INCREASING CROSS AISLE SPACE

(71) Applicant: B/E Aerospace, Inc., Winston-Salem, NC (US)

(72) Inventors: Prasandh M. Selvarajan, Cuddalore (IN); Mallikarjuna R. Guntapati, Hyderabad (IN); Trilok K. Polamarasetti, Visakhapatnam (IN); Abhishek Ghanathey, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/104,942

(22) Filed: Feb. 2, 2023

(65) Prior Publication Data

US 2023/0312108 A1 Oct. 5, 2023

(30) Foreign Application Priority Data

Apr. 1, 2022 (IN) .............................. 202241019967

(51) Int. Cl.
*B64D 11/06* (2006.01)
(52) U.S. Cl.
CPC ........ *B64D 11/0648* (2014.12); *B64D 11/064* (2014.12)
(58) Field of Classification Search
CPC .............. B64D 11/0648; B64D 11/064; B64D 11/0693
See application file for complete search history.

(56) References Cited

U.S. PATENT DOCUMENTS

| | | | |
|---|---|---|---|
| 3,495,872 A | 2/1970 | Gielow et al. | |
| 3,744,843 A | 7/1973 | Barecki et al. | |
| 4,157,797 A | 6/1979 | Fox | |
| 5,352,020 A * | 10/1994 | Wade | B64D 11/06395 |
| | | | 297/423.26 |
| 6,652,033 B2 * | 11/2003 | Satoh | B64D 11/06395 |
| | | | 297/217.3 |
| 7,156,462 B2 * | 1/2007 | Verny | B64D 11/0641 |
| | | | 297/354.12 |
| 7,726,607 B2 | 6/2010 | Schumacher et al. | |

(Continued)

FOREIGN PATENT DOCUMENTS

| | | |
|---|---|---|
| DE | 19534024 C2 | 7/1997 |
| DE | 102016124409 A1 | 6/2018 |
| EP | 1308344 A2 | 5/2003 |

OTHER PUBLICATIONS

Extended European Search Report dated Aug. 22, 2023; European Application No. 23164472.5.

*Primary Examiner* — Brian M O'Hara
(74) *Attorney, Agent, or Firm* — Suiter Swantz IP (57) ABSTRACT

A vehicle seating row for installation in a passenger cabin adjacent an aisle. The seating row includes a framework including at least two laterally adjacent seats. The framework for the outboard most seat is fixed whereas framework for the inboard seat(s) includes a front leg coupled to a front transverse beam movable together toward the rear transverse beam to shorten the length of the at least one second seat to increase cross aisle space to facilitate seat ingress and egress during respective boarding and deplaning. An actuator is operative to displace the front leg and front transverse beam between first and second positions.

14 Claims, 7 Drawing Sheets

(56) References Cited

U.S. PATENT DOCUMENTS

| | | | |
|---|---|---|---|
| 8,251,426 B2 * | 8/2012 | Gerhardt | B60N 2/3031 |
| | | | 296/65.09 |
| 8,556,323 B2 * | 10/2013 | Hoge | B60N 2/12 |
| | | | 296/65.13 |
| 9,713,969 B2 * | 7/2017 | Schomacker | B64D 11/06 |
| 10,633,096 B1 * | 4/2020 | Hoover | A47C 1/0342 |
| 10,647,432 B2 * | 5/2020 | Itzinger | B60N 2/305 |
| 10,710,727 B2 | 7/2020 | Gross | |
| 2003/0209929 A1 | 11/2003 | Muin et al. | |
| 2005/0269451 A1 | 12/2005 | Schumacher et al. | |
| 2013/0093218 A1 | 4/2013 | Yetukuri et al. | |
| 2018/0312258 A1 | 11/2018 | Itzinger et al. | |

* cited by examiner

VEHICLE SEATING ROWS FOR INCREASING CROSS AISLE SPACE

RELATED APPLICATION AND INCORPORATION BY REFERENCE

This U.S. nonprovisional patent application claims the benefit of priority of Indian Patent Application Number 202241019967 filed Apr. 1, 2022 entitled VEHICLE SEATING ROWS FOR INCREASING CROSS AISLE SPACE, the entirety of which is incorporated by reference.

TECHNICAL FIELD AND BACKGROUND

The present disclosure relates generally to vehicle seating rows such as economy class seating rows in aircraft, and more particularly to vehicle seating rows including retractable elements for increasing cross aisle space to facilitate row ingress and egress.

Seating rows provide most of the passenger seating in economy classes in aircraft and other conveyances due to their relative low cost and ability to maximize seating density. In narrow body aircraft, seating rows are arranged to form two columns positioned along opposing sides of a single longitudinal aisle. In wide body aircraft including spaced longitudinal aisles, seating rows are arranged to form three columns including two outboard columns and a single center column positioned between the spaced longitudinal aisles. In most economy classes, the seating rows are positioned forward facing and perpendicular to the longitudinal aisle axis and the aircraft longitudinal axis.

Typical seating rows include at least two laterally adjacent passenger seats, and more commonly three laterally adjacent passenger seats. In wide body aircraft, outboard seating rows typically include three laterally adjacent passenger seats whereas seating rows in the center column typically include three, four or five laterally adjacent passenger seats. Each seating row is positioned adjacent at least one longitudinal aisle. Therefore, as the number of passenger seats in a seating row increases, so does the distance from the outboard seat(s) to the nearest longitudinal aisle. As used herein, the term "outboard" means apart from the nearest longitudinal aisle, whereas the term "inboard" means closest the nearest longitudinal aisle. Thus, for example, a seating row positioned in a narrow body aircraft to one side of a longitudinal aisle would include an inboard (e.g., aisle) seat positioned nearest the longitudinal aisle, an outboard (e.g., window) seat positioned nearest the aircraft fuselage, and a middle seat positioned between the inboard and outboard seats.

The time required to "turn over" an aircraft, wherein passengers on an arriving flight deplane and passengers on a departing flight board, is attributable to several factors including, but not limited to, the size of the aircraft, number of passengers, refueling requirements, baggage handling, cleaning, restocking, etc. However, most of the time required to turn over an aircraft is attributable to the way passengers deplane and board. For example, most passenger deplaning and boarding occurs through a single aircraft exit, typically located near the front of the aircraft. Passenger deplaning and boarding typically starts at the front of the aircraft and continues, row-by-row, toward the back of the aircraft until the aircraft is emptied in the case of deplaning, and filled in the case of boarding.

Each passenger is typically afforded a carry-on bag and personal items such as small bags, purses, computer cases, backpacks, etc. Each passenger may also wear a coat that may be removed once on the plane. Aircraft are equipped with overhead bins and under seat spaces for stowing these items, but accessing the bins and spaces takes time for each passenger to retrieve and gather their belongings, especially when the aircraft is crowded, and overhead space is limited often requiring passengers to stow their belongings apart from their designated seating row. In addition, the low ceiling height of the overhead bins, particularly above the middle and outboard seats, further slows the boarding and deplaning processes by further crowding the passenger seating space.

Solutions have been developed for increasing cross aisle space during deplaning and boarding to facilitate ingress and egress. As used herein, the term "cross aisle space" refers to the space between adjacent rows through which passengers access their seat from the longitudinal aisle and leave their seat to reach the longitudinal aisle. Conventional solutions include various configurations of rotating seat bottoms and seat pans supporting seat bottoms. While these conventional solutions increase cross aisle space, the increase is minimal considering the negligible overhang of the forward extent of the seat bottom beyond the fixed legs and lateral support beams of the seating row.

Therefore, what is needed is a solution for significantly increasing cross aisle space during passenger deplaning and boarding to speed turn over time.

BRIEF SUMMARY

Broadly speaking, the present disclosure provides vehicle seating rows for use in conveyances such as aircraft to maximize cross aisle space during passenger boarding and deplaning.

To achieve the foregoing and other advantages, the inventive aspects disclosed herein are directed to a vehicle seating row for installation in a passenger cabin adjacent an aisle, for instance a longitudinal aisle in an aircraft passenger cabin. The seating row includes a framework including a first seat and a second seat positioned laterally adjacent the first seat. The framework for the first seat includes a fixed rear leg coupled to a fixed rear transverse beam and a fixed front leg coupled to a fixed front transverse beam, the front and rear transverse beams being spaced apart and parallel. The framework for the second seat includes a fixed rear leg coupled to the fixed rear transverse beam and a movable front leg coupled to a movable front transverse beam. The movable front leg and the movable front transverse beam are coupled such that they can be displaced together, relative to the fixed rear leg and the fixed rear transverse beam respectively, between a first position in which the second seat has a maximum length and a second position in which the second seat has a minimum length. An actuator coupled to at least one of the movable front leg and the movable front transverse beam is operative to displace the movable front leg and the movable front transverse beam together between the first and second positions.

In some embodiments, the framework for the first seat further includes spaced frame members coupled to each of the fixed rear transverse beam and the fixed front transverse beam are operative to support a seat bottom and a backrest.

In some embodiments, the framework for the second seat further includes spaced backrest members coupled to the fixed rear transverse beam and spaced seat bottom members rotatably coupled at one end to the fixed rear transverse beam, wherein forward ends of the spaced seat bottom members define elongated guides receiving the movable front transverse beam such that the movable front transverse beam travels along the elongated guides as the movable front transverse beam is displaced between the first and second positions.

In some embodiments, the elongated guides are inclined in a direction of the movable front leg, i.e., toward the forward direction, such that when the movable front transverse beam displaces from the first position to the second position the forward ends of the seat bottom members displace upwards.

In some embodiments, the bottom end of the movable front leg is slidably received in a guide mountable to the floor, wherein the guide is operative to guide horizontal translation of the movable front leg as the movable front leg is displaced between the first and second positions while preventing movement of the movable front leg apart from the floor.

In some embodiments, the vehicle seating row is installable in an aircraft, the first position corresponds to a flight condition of the aircraft, and the second position corresponds to at least one of a boarding and a deplaning condition of the aircraft.

In some embodiments, the framework further includes a third seat positioned laterally adjacent the second seat and apart from the first seat, with third seat framework the same as or substantially similar to the framework of the second seat.

In some embodiments, the vehicle seating row is installable in an aircraft with the first seat positioned apart from the aisle, the third seat positioned adjacent the aisle, and the second seat positioned as a middle seat between the first and third seats, the first position of the second and third seats corresponds to a flight condition of the aircraft, and the second position of the second and third seats corresponds to at least one of a boarding and a deplaning condition of the aircraft.

In another aspect, the present disclosure is directed to a passenger seating row installable in an aircraft adjacent and substantially perpendicular to a longitudinal aisle. The seating row includes a framework including a first seat positionable apart from the longitudinal aisle, a second seat positioned laterally adjacent the first seat, and a third seat positionable laterally adjacent the longitudinal aisle. The framework for the first seat includes a fixed rear leg coupled to a fixed rear transverse beam and a fixed front leg coupled to a fixed front transverse beam. The framework for each of the second and third seats includes a fixed rear leg coupled to the fixed rear transverse beam and a movable front leg coupled to a movable front transverse beam, wherein the movable front leg and the movable front transverse beam are coupled such that the movable front leg and the movable front transverse beam are displaceable together relative to the fixed rear leg and the fixed rear transverse beam, respectively, between a first position in which the second seat has a maximum length and a second position in which the second seat has a minimum length. Each of the second and third seats includes and actuator, or the seats share a single actuator, coupled to at least one of the movable front leg and the movable front transverse beam, wherein the actuator is operative to displace the movable front leg and the movable front transverse beam together between the first and second positions.

In some embodiments, wherein, for each of the second and third seats, the movable front leg and the movable front transverse beam horizontally translate as they are displaced between the first and second positions causing the seat bottom members to pivot about the fixed rear transverse beam.

Embodiments can include one or more or any combination of the above-mentioned features.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Figure 1:
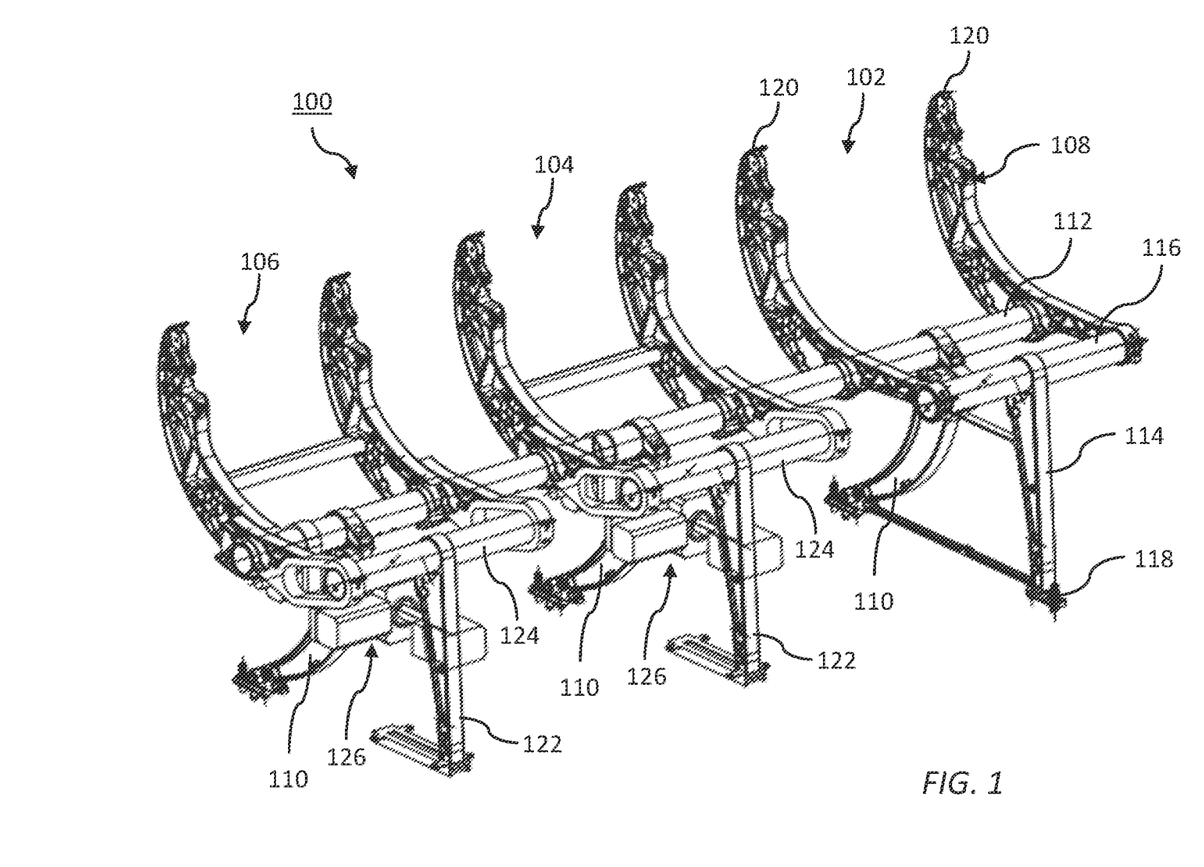
FIG. 1 is a perspective of a vehicle seating row system, according to the present disclosure, showing the vehicle seating row in an extended configuration.

Referring to FIG. 1, a vehicle seating row according to an embodiment of the present disclosure is shown at reference numeral 100. As shown, the seating row 100 includes three laterally adjacent seats including a first seat 102, a second seat 104, and a third seat 106. In a particular installation in which the seating row 100 is installed in an aircraft adjacent and perpendicular to a longitudinal aisle, the first seat 102 may be positioned as a window seat, the third seat 106 positioned as an aisle seat, and the second seat 104 positioned as a middle or center seat.

As discussed below, when the seating row 100 is positioned adjacent a longitudinal aisle, the first seat 102 has a particular configuration considering its distance from the nearest longitudinal aisle, and the second and third seats 104, 106 have a different configuration considering their proximity to the same longitudinal aisle. The configuration of the first seat 102 is different from the configuration of the second and third seats 104, 106 considering passengers gain access to the first and second seats 102, 104 via the cross aisle space formed between adjacent seats row or a seat row and a forward wall. Seating rows may include greater or lesser number of seats, for example, two seats, four seats, five seats, etc. In wide body aircraft including a center column positioned between two longitudinal aisles, any seat that is passed to gain access to another seat may be configured as a second or third seat as discussed above, whereas any seat that is not passed to gain access may be configured as a first seat as discussed above.

Although not shown for clarity of the underlying framework 108, each seat 102, 104, 106 preferably includes a seat bottom and a backrest, which may separate, coupled together or integrally formed. Each of the seat bottom and the backrest may include a support member supporting a cushion member and may optionally include a dress cover. The seating row 100 may further include fixed position or adjustable armrests coupled the framework. The configuration and materials of the passenger support and comfort members of the seats, and the armrests, are not limited to any type as the framework elements discussed herein in detail are compatible for use with various seat designs. The framework elements discussed herein are further compatible for use with various seat recline mechanisms.

The framework for the first seat 102 generally includes a fixed rear leg 110 coupled to a fixed rear transverse beam 112, and a fixed front leg 114 coupled to a fixed front transverse beam 116. The fixed rear transverse beam 112 may be shared by all the seats 102, 104, 106 and span substantially the width of the seating row 100. In some embodiments, the front and rear transverse beams 116, 112 are spaced apart and parallel. As used herein, the terms "front" and "rear" are used with reference to the seats themselves and not necessarily with reference to the conveyance or direction of travel. In some embodiments, the fixed front and rear legs 114, 110 may be separate, attached or integrally formed. Each of the fixed front and rear legs 114, 110 include a track fastener assembly 118 for securing the legs to the floor or a seat track positioned in the floor.

The framework for the first seat 102 further includes spaced frame members 120 coupled to each of the fixed rear transverse beam 112 and the fixed front transverse beam 116 operative to support a seat bottom and a backrest (not shown). In some embodiments, each of the spaced frame members 120 includes spaced front and rear openings receiving the respective front and rear transverse beams 116, 112 therethrough. In some embodiments, the transverse beams are hollow beam tubes. In some embodiments, the front transverse beam 116 is elevated slightly as compared to the rear transverse beam 112 to impart a slight incline in the seat bottom toward the front. Each of the spaced frame members 120 may be constructed from attached components or may be integrally formed and may be foraminous for weight savings. While the backrest may be reclinable relative to the frame members 120, the seat bottom is preferably positionally fixed, or at least the front and rear transverse beams 116, 112 are positionally fixed.

The framework for the second seat 104 also includes a fixed rear leg 110 coupled to the fixed rear transverse beam 112. In contrast to the fixed front leg 114 of the first seat 102, the front leg 122 of the second seat 104 is movable, as is the front transverse beam 124 to which the front leg 122 is coupled. The movable front leg 122 and the movable front transverse beam 124 are coupled such that they can be displaced together, relative to the fixed rear leg 114 and the fixed rear transverse beam 112, respectively, between a first position as shown in FIG. 1 in which the second seat 104 has a maximum length and a second position (shown in FIG. 4) in which the second seat 104 has a minimum length.

At least one of the movable front leg 122 and the movable front transverse beam 124 is coupled to an actuator assembly 126 positioned below the seat bottom. As shown, the actuator assembly 126 may be attached to the fixed rear leg 110 and the driven member coupled to the movable front leg 122. In use, the actuator assembly 126 is operative to displace the first leg 122 between first and second positions, wherein the first position is shown in FIG. 1 and corresponds to an in use or flight condition in which cross aisle space is minimized, and the second position (shown in FIG. 4) corresponds to a boarding or deplaning condition in which cross aisle space is maximized. Types of actuator assemblies include, but are not limited to, linear actuators, worm gear assemblies and the like operative to drive the front leg 122 toward and apart from the rear leg 110. An actuator coupled to at least one of the movable front leg and the movable front transverse beam is operative to displace the movable front leg and the movable front transverse beam together between the first and second positions.

With continued reference to FIG. 1, like or similar to the second seat 104, the third seat 106 also includes a framework including a fixed rear leg 110 coupled to the fixed rear transverse beam 112, movable front leg 122 coupled to a movable front transverse beam 124, actuator assembly 126 driving movement of the front leg 122, etc. In some embodiments, the front transverse beams of the second and third seats 104, 106 may be coupled or a single transverse front beam may serve both seats, and a single actuator assembly 126 may drive movement of both front legs 122 and both front transverse beams 124 simultaneously.

Figure 2A:
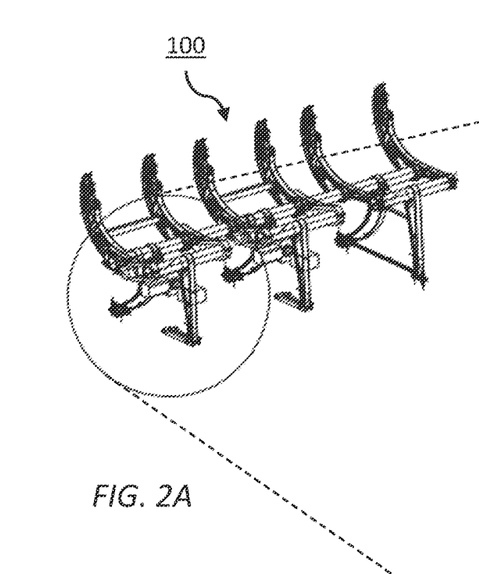
FIG. 2A is a perspective view of the vehicle seating row of FIG. 1.
Figure 2B:
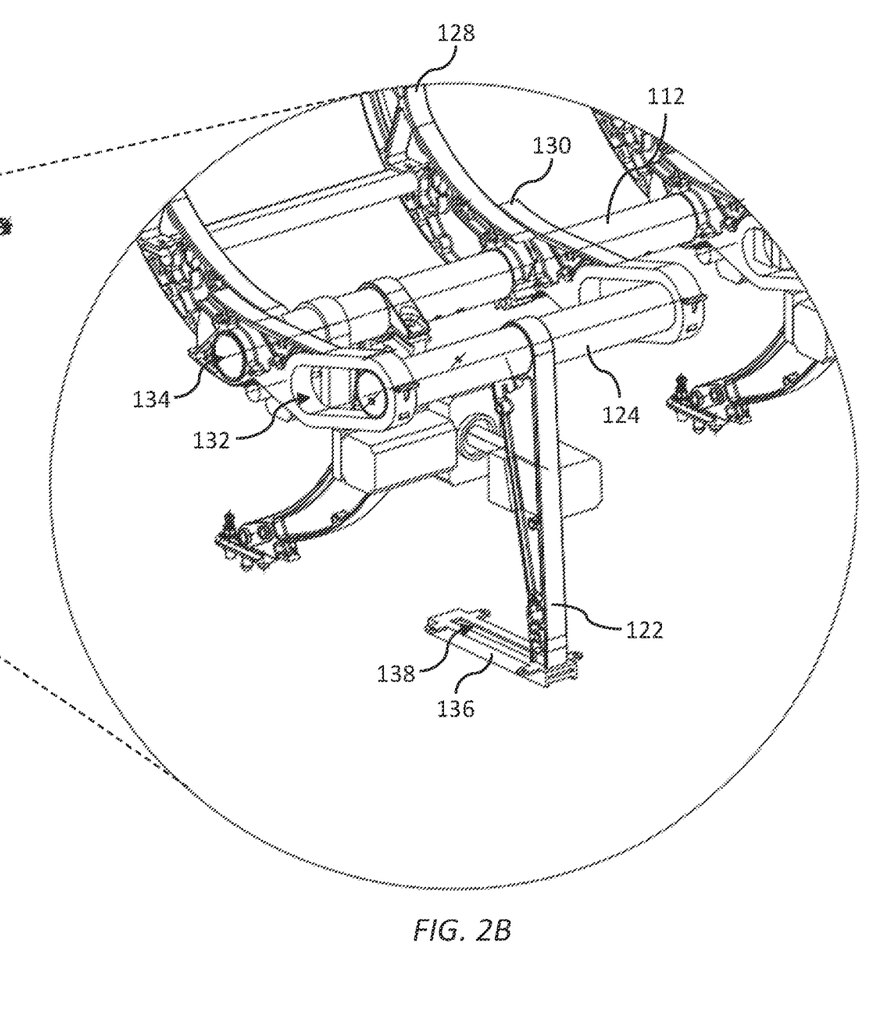
FIG. 2B is a detailed view of FIG. 2A.

With reference to FIGS. 2A and 2B, the framework for each of the second and third seats further includes spaced backrest members 128 coupled to the fixed rear transverse beam 112, and spaced seat bottom members 130 rotatably coupled at one end to the fixed rear transverse beam 112. Forward or front ends of the spaced seat bottom members 130 define elongated guides 132 each receiving a terminal end or portion of its respective movable front transverse beam 124 such that the movable front transverse beam 124 travels along the elongated guides 132 as the movable front transverse beam 124 is displaced between the first and second positions. The length of the elongated guides is determinative of the length of travel of the front transverse beam 124 and consequently the cross aisle space difference between the first and second positions.

The elongated guides 132 are inclined in a direction of the movable front leg 122, i.e., in the forward direction, such that when the movable front transverse beam 124 displaces from the first position to the second position, the forward ends of the seat bottom members 130 displace upwards as the seat bottom members 130 pivot about the pivot axis 134 defined by the rear transverse beam 112. In use, movement of the front leg 122 and simultaneous movement of the front transverse beam 124 within the elongated guide 132 causes the seat bottom members 130 to pivot and the forward ends thereof to rise, thereby shortening the length of the respective seat. Shortening the seat length while also moving the front leg 122 and front transverse beam 124 rearward clears space forward of the seat thereby maximizing the cross aisle space to facilitate ingress and egress to the outboard seat(s).

The bottom end of the movable front leg 122 is slidably received in a guide 136 mountable to the floor. The guide 136 is operative to guide horizontal translation of the movable front leg 122 as the movable front leg is displaced between the first and second positions, while preventing movement of the movable front leg 122 apart from the floor. In some embodiments, the guide 136 defines an elongated linear opening 138 and the front leg 122 interacts with the opening to permit horizontal movement while preventing vertical movement. For example, the guide 136 forms an overhang and a portion of the front leg 122 is positioned below the overhang and a portion of the front leg passes through the opening, thereby allowing horizontal translation while preventing vertical translation and or rotation. In some embodiments, the length of the linear opening 138 substantially corresponds to the horizontal length of the elongated guide 132 such that the front leg 122 and the front transverse beam 124 travel substantially equal amounts between the first and second positions.

Figure 3:
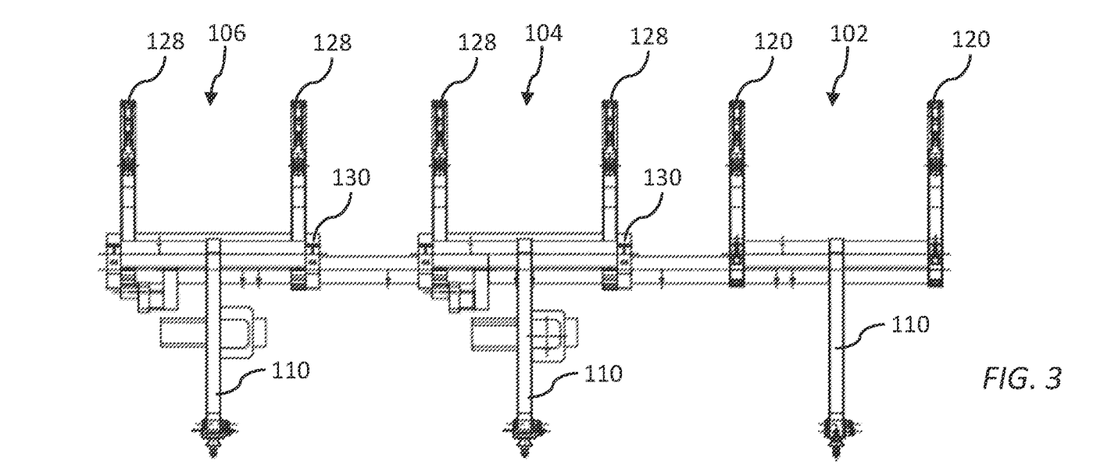
FIG. 3 is a back view of the vehicle seating row of FIG. 2A.
Figure 4:
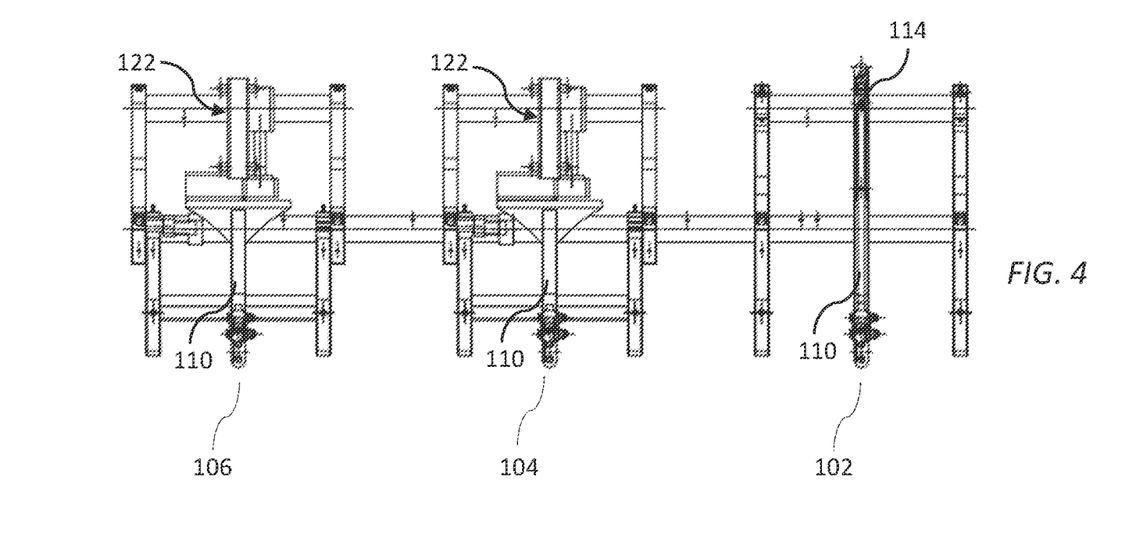
FIG. 4 is a bottom view of the vehicle seating row of FIG. 2A.

With reference to FIGS. 3 and 4, the different framework configuration of the first seat 102 as compared to the framework configurations of the second and third seats 104, 106 can be seen. Particularly, the different configuration of the spaced frame members 120 of the first seat 102 compared to the seat bottom frame members 130 and backrest frame members 128 of the second and third seats 104, 106. In addition, the generally centered position of the front legs 114, 122 and rear legs 110 relative to the respective spaced frame members 120 of the first seat 102 and the seat bottom members 130 and backrest members 128 of the second and third seats 104, 106.

Figure 5:
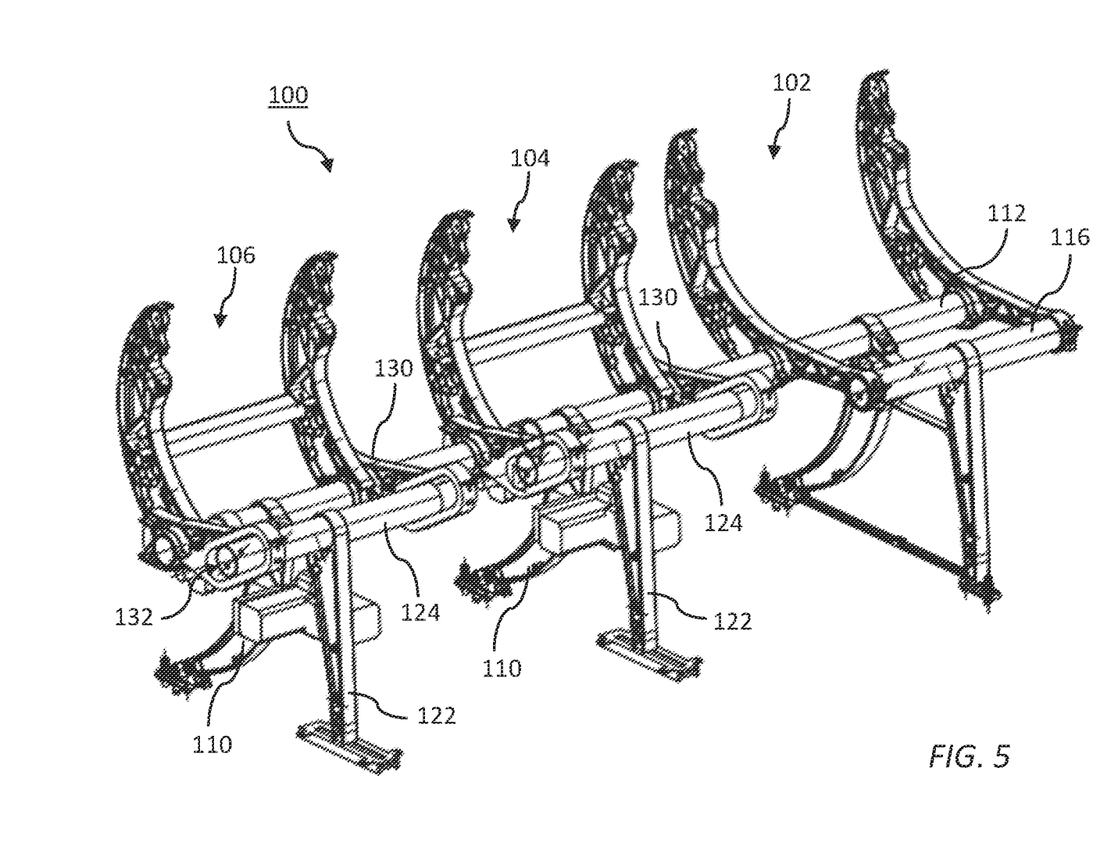
FIG. 5 is a perspective view of the vehicle seating row system of FIG. 1, showing the vehicle seating row in a retracted configuration.

With reference to FIG. 5, the seating unit 100 is shown with the front legs 122 and the front transverse beams 124 of the second and third seats 104, 106 displaced to their respective second position such that the front legs 122 are positioned closer to their respective rear leg 110 and the front transverse beams 124 are positioned closer to the rear transverse beam 112. As evident comparing FIGS. 1 and 4, displacing the front transverse beams 124 and the front legs 122 rearward causes the seat bottom frame members 130 to pivot causing their forward ends to rise to shorten the seat length. Also, evident comparing FIGS. 1 and 4, the front legs 122 and transverse beams 124 horizontally translate, such that the horizontal translation of the front transverse beams 124 drives the forward ends of the seat bottom frame members 128 upward due to the interaction of the front transverse beams 124 with the includes elongated guides 132. Further evident comparing FIGS. 1 and 4, the front transverse beams 124 of the second and third seats 104, 106, when in their respective second positions, and farther rearward as compared to the fixed front transverse beam 116 of the first seat 102.

Figure 6A:
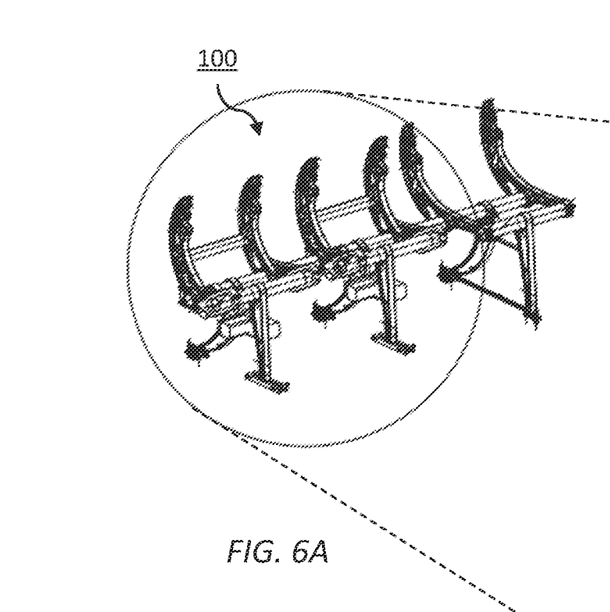
FIG. 6A is a perspective view of the vehicle seating row of FIG. 5.
Figure 6B:
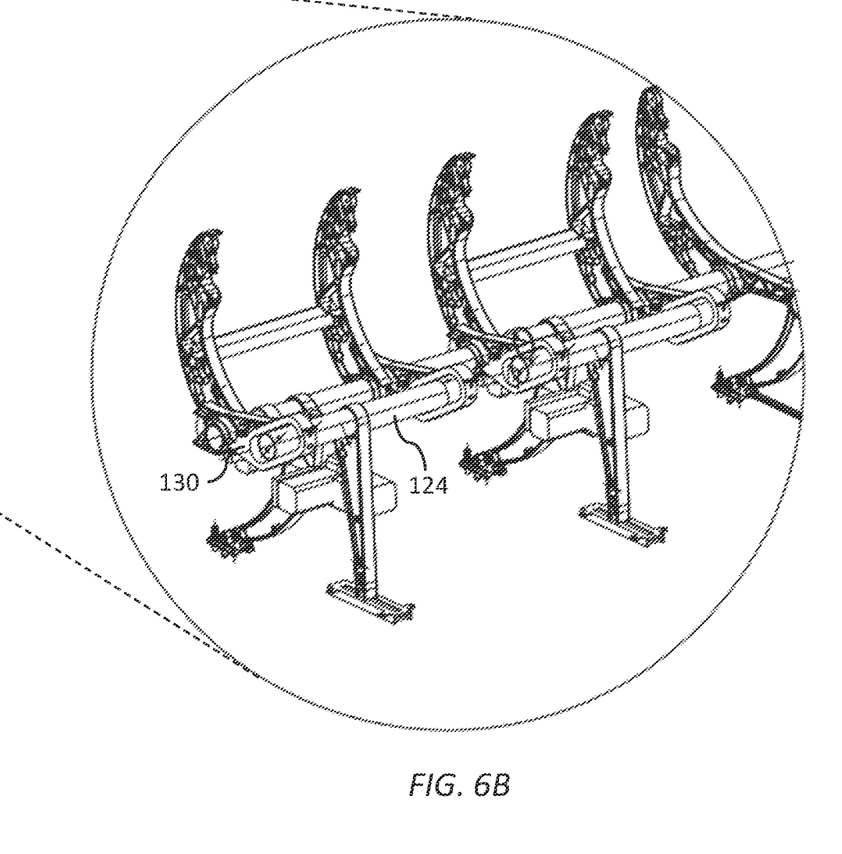
FIG. 6B is a detailed view of FIG. 6A.

With reference to FIGS. 6A and 6B, the pivoting motion of the seat bottom frame members 130 from the translating front transverse beam 124 can be seen, thereby increasing the cross aisle space forward of the second and third seats of the seating row 100.

Figure 7:
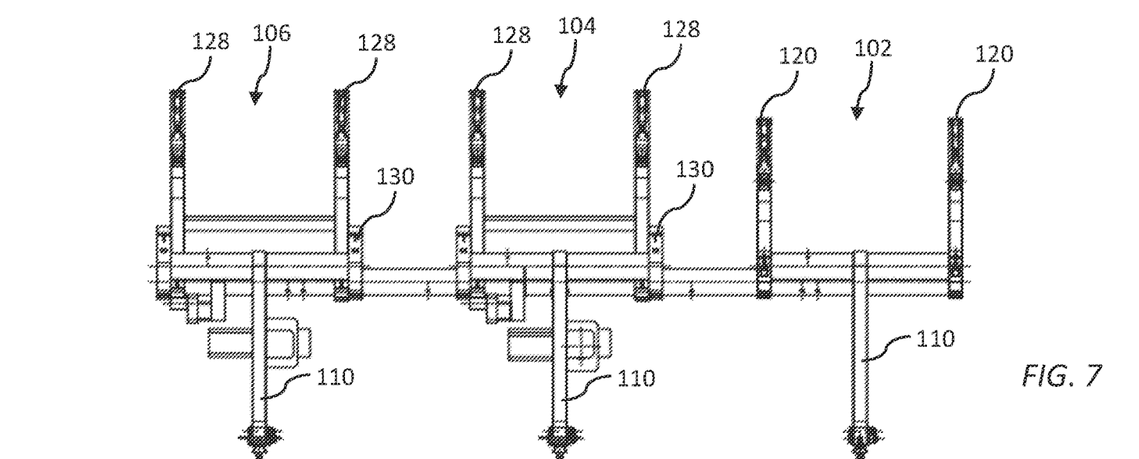
FIG. 7 is a back view of the vehicle seating row of FIG. 6A.
Figure 8:
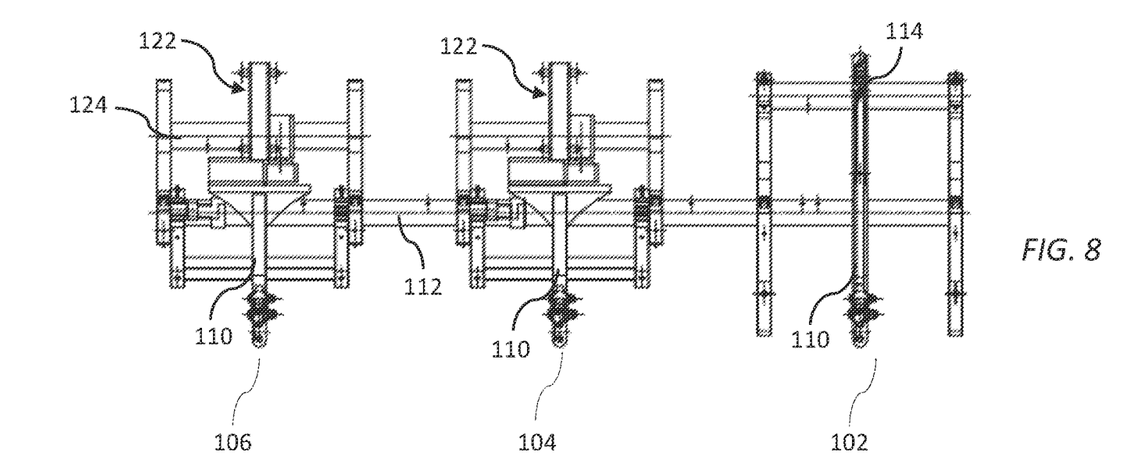
FIG. 8 is a bottom view of the vehicle seating row of FIG. 6A.

With reference to FIGS. 7 and 8, the different framework configuration of the first seat 102 as compared to the framework configurations of the second and third seats 104, 106 can be seen. Particularly, the different configuration of the spaced frame members 120 of the first seat 102 compared to the seat bottom frame members 130 and backrest frame members 128 of the second and third seats 104, 106. Further, the generally centered position of the front legs 114, 122 and rear legs 110 relative to the respective spaced frame members 120 of the first seat 102 and the seat bottom members 130 and backrest members 128 of the second and third seats 104, 106. In addition, the closer positions of the front transverse beams relative to the rear transverse beam 112.

Figure 9:
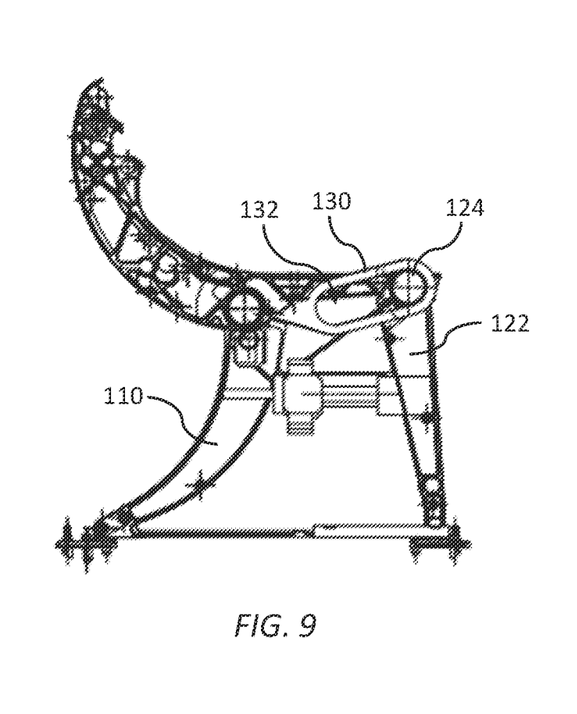
FIG. 9 is a side view of the vehicle seating row shown in the extended configuration.
Figure 10:
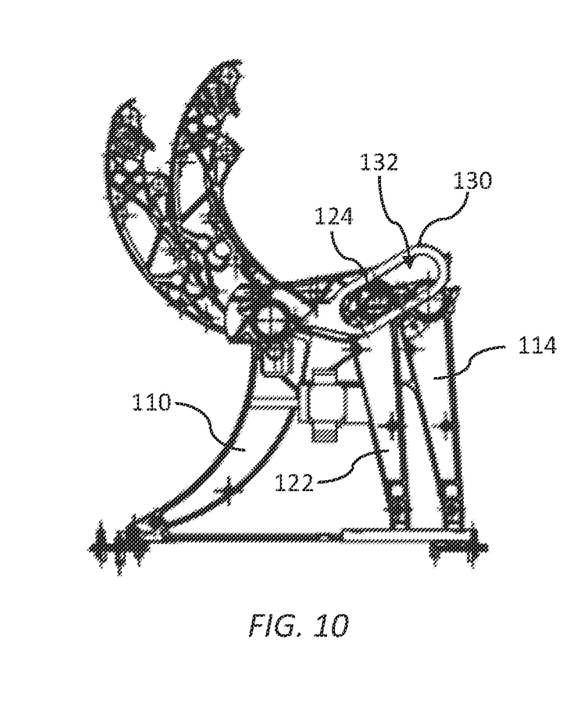
FIG. 10 is a side view of the vehicle seating row shown in the retracted configuration.

With reference to FIGS. 9 and 10, the positions of the front legs 114, 122 relative to the fixed rear legs 110 when the front legs 122 are in the first position can be seen in FIG. 9, whereas the positions of the front legs 122 relative to the rear legs 110 and the front leg 114 of the first seat can be seen in FIG. 10. Also apparent comparing FIGS. 9 and 10 is the change in position of the front transverse beam 124 resulting in the change in incline of the seat bottom frame members 130. The length of travel of the front transverse beam 124 and/or the inclination of the elongated slot 132 change be customized to control angular change, and consequently the shortening, of the seat bottom.

In further aspects, actuator assembly operation may be controllable by the passenger, by the flight crew or according to deplaning and boarding protocols. Actuator controls may be located at the seat position or remote therefrom, and actuator assemblies may be controlled individually, collectively or in predetermined groupings via conventional control means.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A vehicle seating row for installation in a passenger cabin adjacent to an aisle, the vehicle seating row comprising:
   a framework including a first seat and a second seat;
   the framework for the first seat includes:
      a fixed rear leg mounted to a fixed rear transverse beam and mountable to a first seat track; and
      a fixed front leg mounted to a fixed front transverse beam and mountable to the first seat track; and
   the framework for the second seat includes:
      a fixed rear leg mounted to a fixed rear transverse beam and mountable to a second seat track;
      a movable front leg mounted to a movable front transverse beam, the movable front leg and the movable front transverse beam displaceable relative to the fixed rear leg and the fixed rear transverse beam between a first position in which the second seat has a maximum length and a second position in which the second seat has a minimum length;
      an actuator coupled to at least one of the movable front leg and the movable front transverse beam, the actuator configured to displace the movable front leg and the movable front transverse beam between the first and second positions; and
      a floor mountable guide, wherein one end of the movable front leg is slidably received in the floor mountable guide, the floor mountable guide is configured to constrain horizontal translation of the movable front leg between the first and second positions, and the floor mountable guide defines a linear opening having a length determinative of an amount of displacement of the movable front leg between the first and second positions.

2. The vehicle seating row according to claim 1, wherein the framework for the first seat further includes spaced frame members coupled to each of the fixed rear transverse beam and the fixed front transverse beam, wherein the spaced frame members support a seat bottom and a backrest.

3. The vehicle seating row according to claim 1, wherein the framework for the second seat further includes:
   spaced backrest members coupled to the fixed rear transverse beam; and
   spaced seat bottom members rotatably coupled at one end to the fixed rear transverse beam;
   wherein forward ends of the spaced seat bottom members define elongated guides receiving the movable front transverse beam such that the movable front transverse beam travels along the elongated guides as the movable front transverse beam is displaced between the first and second positions.

4. The vehicle seating row according to claim 3, wherein the elongated guides are inclined in a direction of the movable front leg such that, when the movable front transverse beam displaces from the first position to the second position, the forward ends of the seat bottom members displace upwards.

5. The vehicle seating row according to claim 1, wherein the floor mountable guide is configured to prevent upward motion of the movable front leg.

6. The vehicle seating row according to claim 1, wherein:
   the vehicle seating row is installable in an aircraft;
   the first position corresponds to a flight condition of the aircraft; and
   the second position corresponds to at least one of a boarding and a deplaning condition of the aircraft.

7. The vehicle seating row according to claim 1, wherein:
   the framework further includes a third seat positioned laterally adjacent to the second seat and apart from the first seat; and
   the framework for the third seat includes:
      a fixed rear leg mounted to a fixed rear transverse beam and mountable to a third seat track;
      a movable front leg mounted to a movable front transverse beam, the movable front leg and the movable front transverse beam displaceable relative to the fixed rear leg and the fixed rear transverse beam between a first position in which the third seat has a maximum length and a second position in which the third seat has a minimum length;
      an actuator coupled to at least one of the movable front leg and the movable front transverse beam, the actuator configured to displace the movable front leg and the movable front transverse beam between the first and second positions; and
      a floor mountable guide, wherein one end of the movable front leg is slidably received in the floor mountable guide, the floor mountable guide is configured to constrain horizontal translation of the movable front leg between the first and second positions, and the floor mountable guide defines a linear opening having a length determinative of an amount of displacement of the movable front leg between the first and second positions.

8. The vehicle seating row according to claim 7, wherein the framework for the third seat further includes:
   spaced backrest members coupled to the fixed rear transverse beam; and
   spaced seat bottom members rotatably coupled at one end to the fixed rear transverse beam;
   wherein forward ends of the spaced seat bottom members define elongated guides receiving the movable front transverse beam such that the movable front transverse beam travels along the elongated guides as the movable front transverse beam is displaced between the first and second positions; and
   the elongated guides are inclined in a direction of the movable front leg such that, when the movable front transverse beam displaces from the first position to the second position the forward ends of the seat bottom members displace upwards.

9. The vehicle seating row according to claim 8, wherein:
   the vehicle seating row is installable in an aircraft with the first seat positioned apart from the aisle, the third seat positioned adjacent the aisle, and the second seat positioned as a middle seat between the first and third seats;
   the first position of the second and third seats corresponds to a flight condition of the aircraft; and
   the second position of the second and third seats corresponds to at least one of a boarding and a deplaning condition of the aircraft.

10. A passenger seating row installable in an aircraft adjacent and substantially perpendicular to a longitudinal aisle, comprising:
   a framework including a first seat positionable apart from the longitudinal aisle, a second seat positioned laterally adjacent the first seat, and a third seat positionable laterally adjacent the longitudinal aisle;
   the framework for the first seat includes:
      a fixed rear leg mounted to a fixed rear transverse beam and mountable to a first seat track; and
      a fixed front leg mounted to a fixed front transverse beam and mountable to the first seat track; and
   the framework for each of the second and third seats includes:
      a fixed rear leg mounted to a fixed rear transverse beam and mountable to one of a respective second or third seat track;
      a movable front leg mounted to a movable front transverse beam, the movable front leg and the movable front transverse beam displaceable relative to the fixed rear leg and the fixed rear transverse beam between a first position corresponding to a maximum seat length and a second position corresponding to a minimum seat length;
      an actuator coupled to at least one of the movable front leg and the movable front transverse beam, the actuator configured to displace the movable front leg and the movable front transverse beam between the first and second positions; and
      a floor mountable guide, wherein one end of the movable front leg is slidably received in the floor mountable guide, the floor mountable guide is configured to constrain horizontal translation of the movable front leg between the first and second positions, and the floor mountable guide defines a linear opening having a length determinative of an amount of displacement of the movable front leg between the first and second positions.

11. The passenger seating row according to claim 10, wherein the framework for the first seat further includes spaced frame members coupled to each of the fixed rear transverse beam and the fixed front transverse beam, wherein the spaced frame members support a seat bottom and a backrest.

12. The passenger seating row according to claim 10, wherein the framework for each of the second and third seats further includes:
- spaced backrest members coupled to the fixed rear transverse beam; and
- spaced seat bottom members rotatably coupled at one end to the fixed rear transverse beam;
- wherein forward ends of the spaced seat bottom members define elongated guides receiving the movable front transverse beam such that the movable front transverse beam travels along the elongated guides as the movable front transverse beam is displaced between the first and second positions.

13. The passenger seating row according to claim 12, wherein the elongated guides are inclined in a direction of the movable front leg such that, when the movable front transverse beam displaces from the first position to the second position, the forward ends of the seat bottom members displace upwards.

14. The passenger seating row according to claim 13, wherein, for each of the second and third seats, the movable front leg and the movable front transverse beam horizontally translate as they are displaced between the first and second positions thereby causing the seat bottom members to pivot about the fixed rear transverse beam.

* * * * *